Aug. 30, 1927.

E. GONDER 1,640,496

VEHICLE SIGNAL

Filed April 17, 1922  2 Sheets-Sheet 1

INVENTOR.
Earl Gonder
BY
ATTORNEY.

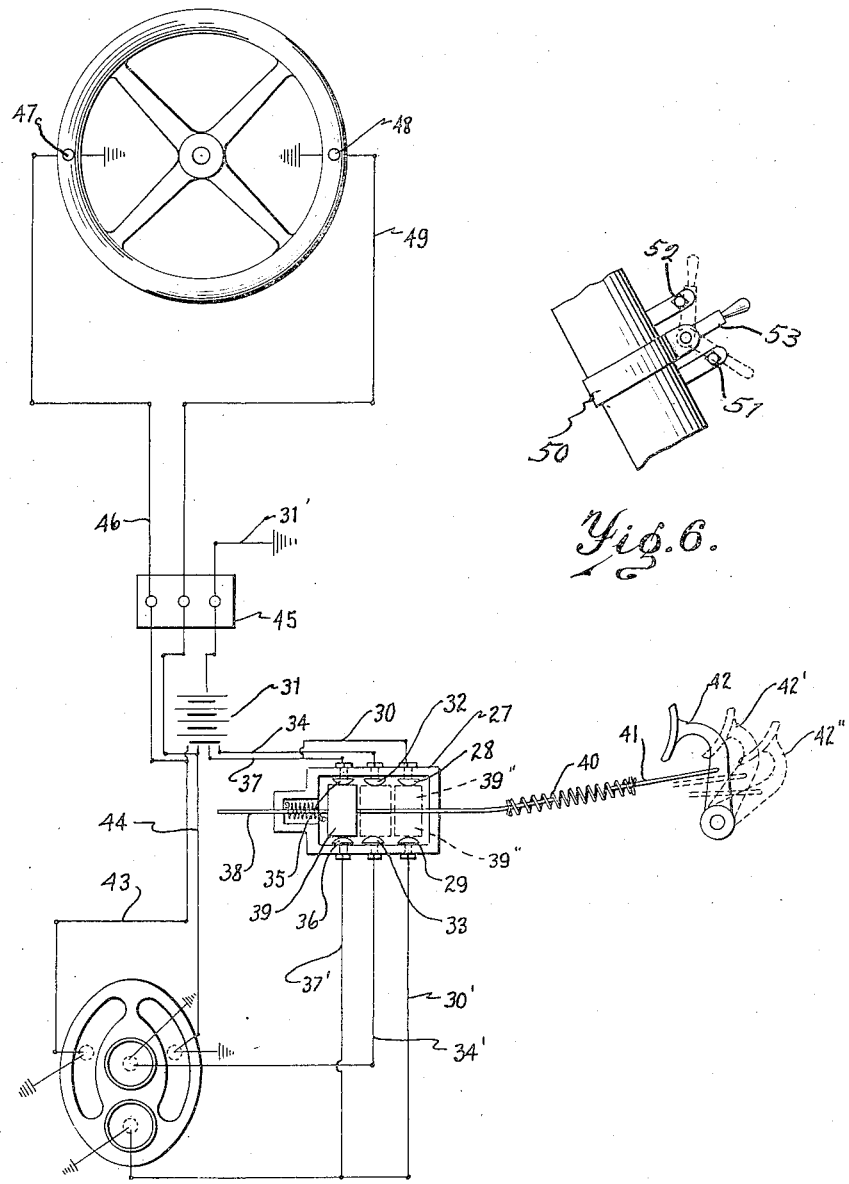

Patented Aug. 30, 1927.

1,640,496

UNITED STATES PATENT OFFICE.

EARL GONDER, OF DETROIT, MICHIGAN.

VEHICLE SIGNAL.

Application filed April 17, 1922. Serial No. 553,874.

My invention relates to a new and useful improvement in a vehicle signal and has for its object the provision of a vehicle signal which will be simple in structure, economical of manufacture and highly efficient in use.

Another object of the invention is the provision in a vehicle signal of means for lighting a series of lights or displaying a series of indicators upon the application of the brake of the vehicle.

Another object of the invention is the provision in a vehicle signal of means for indicating the direction of turn of the vehicle and of displaying said indicators manually.

Other objects will appear hereinafter.

The invention consists in the combinations and arrangements of parts hereinafter described and claimed.

Figure 1:
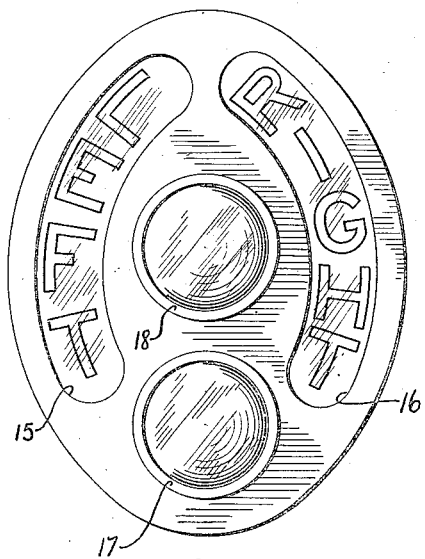
Figure 2:
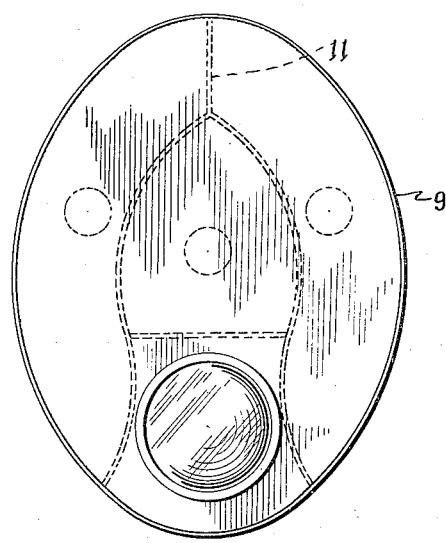
Figure 3:
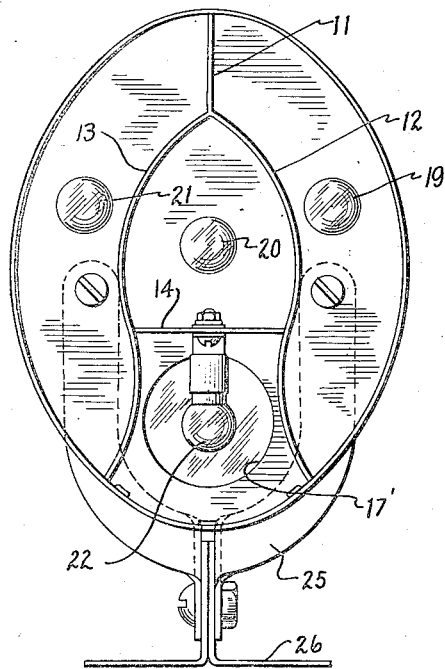
Figure 4:
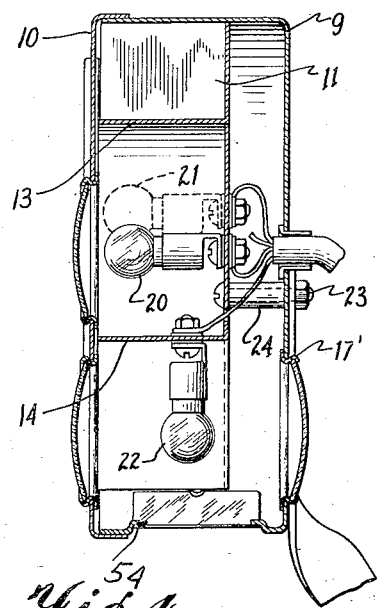

The invention will be better understood from a reference to the accompanying drawings which form a part of this specification and in which Fig. 1 is a front elevational view of the invention, Fig. 2 is a rear elevational view of the invention, Fig. 3 is a sectional view illustrating the interior of the casing used in the invention, Fig. 4 is a central vertical sectional view of the invention, Fig. 5 is a diagrammatic view of the wiring used in the invention, and Fig. 6 is an elevational view of a modified form of circuit breaker used in the invention.

The invention is adapted for use with vehicles of different kinds and is especially useful in connection with automobiles. In the invention there is provided a plurality of signals whereby anyone approaching the vehicle from the rear or following it may be warned as to what the driver is intending to do relative to turning or changing his speed, thus providing means for eliminating accidents. As will be seen as the description proceeds the invention comprises principally four signals which are visible from the rear of the vehicle, only one of these lights being lit while the vehicle is in motion normally and only one of these signals being displayed while the vehicle is at rest normally.

When the brake is applied a red signal which is normally displayed is dimmed or rendered invisible and a green signal is rendered visible for a short time. As the application of the brake continues the green signal is rendered invisible and the red signal is again made visible. When it is desired to turn the vehicle in either direction a signal indicating the direction of turn of the vehicle is displayed.

Another feature of the invention lies in the fact that the red signal which is normally lighted and which is rendered invisible for a short time upon the application of the brake of the vehicle is also utilized for the customary tail light.

The invention, in its preferred form comprises a casing or shell 9 having a front wall 10. Positioned within the casing is a spacing shell having a partition wall 11 connected with which is another partition wall 12 and 13 and a wall 14 which serve to establish different compartments in the casing. Positioned in these compartments are electric light bulbs 19, 20, 21 and 22, one being in each compartment, three of the bulbs being suitably mounted on the rear wall of the lining element and the other being suitably mounted in a depending manner on the partition 14. The front wall of the casing is provided with a slot 15 in which is positioned a lens. On the lens is presented the word Left, the arrangement being such that when the bulb 13 is lit the word "Left" will stand out prominently and be visible from the rear of the vehicle, it being intended that the operator shall light the bulb 13 when he is about to make a left turn and thus give notice of his intention of making such a turn.

Provided in the wall 10 of the casing is a slot 16 which is also provided with a lens and which bears the word "Right", the driver utilizing this indicator the same as the indicator bearing the word "Left." Provided in the casing wall 10 is an opening 17 in which is positioned a lens which is preferably red. Provided in the wall 10 is another opening 18 in which is positioned a lens which is preferably green. An electric light is provided for each of these lenses so as to make the red or green indicator visible from the rear of the vehicle when lighted. Provided in the rear wall of the casing is an opening 17' which is provided with a lens, said opening being in alignment with the opening 17 and being provided with a clear lens, this opening serving to afford a parking light, the bulb 22 being lit when the vehicle is standing still.

A bolt 23 serves to retain the liner in position in the casing, a sleeve 24 serving to retain the members in spaced relation. A yoke 25 is mounted on the casing and is provided with a standard 26 which may be secured to the vehicle at any convenient place, such as on the rear mud guard or on the rear of the vehicle. If it is desired to fasten the device on the rear of the vehicle the parking light or opening may be dispensed with. It will be noted that the casing is provided on its under surface with an opening 53 which is closed with any suitable transparent closure, thus allowing the bulb 22 to serve as a parking light, a tail light, a stop signal and a license light.

The method of operating the device is illustrated in Figs. 5 and 6. A switch box 27 is provided, to be mounted in any suitable place on the vehicle. Mounted in this box are spring contact members 28 and 29, 32 and 33, and 35 and 36. The contact member 28 is connected by means of the wire 30 with the battery 31 which is suitably grounded by means of the wire 31'. The contact member 29 is connected by means of the wire 30' to the bulb 22. The contact member 32 is connected by means of the wire 34 to the battery and the contact member 33 is connected by means of the wire 34' to the bulb 20. The contact member 35 is connected by means of the wire 37 to the battery and a wire 37' serves to connect the contact member 36 to the bulb 22. A rod 38 is slidably positioned in the box 27 and carries a contact member 39 which is designed to engage the contact members 35 and 36, 32 and 33 and 28 and 29 so as to close the circuit between these members in succession as the member 39 is slid in the box. The rod 38 is attached to a spiral spring 40 which in turn is attached to a rod 41 which is secured to the brake pedal 42.

The operation of the device is as follows: When the brake pedal is in normal position, as shown in full in Fig. 5, the member 39 is closing the circuit to the bulb 22 which is the red light, each of the bulbs being suitably grounded. When the brake is slightly applied so as to lessen the speed of the vehicle the member 39 moves to the position indicated by 39'; the brake pedal moving to the position shown by 42'. This opens the circuit to the bulb 22 and closes the circuit to the bulb 20, causing the red light to disappear and the green light to appear. As the brake pedal is moved to the position shown by 42'' the member 39 moves to the position shown by 39'' thus opening the circuit leading to the light 20 and again closing the circuit leading to the light 22, thereby causing the red light to disappear, a green light to appear for a short time and the red light to reappear when the brake is applied to the vehicle for stopping the same. When the brake is applied merely to slow up the vehicle the red light disappearing and the green light appearing causes a warning to be flashed to vehicles approaching from or following in the rear. It will be noted that the bulb 22 is lit when the brake pedal is in its normal position and when the brake is tightly applied.

A wire 44 connects the bulb 19 with the battery and wire 43 connects bulb 21 to the battery. The wire 43 is connected by means of wire 46 to a suitable switch 47 positioned on the steering wheel, one side of said switch being suitably grounded. The wire 44 is connected by means of the wire 49 to another switch 48 also positioned on the steering wheel or some convenient place and also being suitably grounded. By operating the proper switch the driver may illuminate the proper direction signal or indicator.

In Fig. 6 I have shown a means for mounting the switches which control the direction lights on the steering post. A band 50 is provided which is clamped or otherwise suitably mounted on the steering post and insulated therefrom. This band is provided with contact members 51 and 52 which are suitably connected by wiring to the direction indicating lights. Pivotally mounted on the band is an arm 53 which may be swung into engagement with either of the member 51 or 52, said arm being suitably grounded so as to allow the closing of the circuit to the lights 19 or 21 when in contact with the members 51 or 52.

It is thus seen that I have provided a vehicle signal having means for warning those in the rear of the vehicle what action the driver is taking or about to take and for serving as a parking light, a tail light and a license plate light.

While I have illustrated and described the preferred forms of construction I do not wish to limit myself to the precise forms of construction shown but desire to avail myself of such variations and modifications as come within the scope of the appended claims.

Having thus described my invention what I claim as new and desire to secure by Letters Patent is:

1. In a vehicle signal a casing comprising substantially elliptical side walls, having a rear wall formed integral therewith, said rear wall being provided with an opening formed therein, adjacent the lower side thereof; a front wall mounted on said side walls adapted for overlapping the same, said front wall being provided with a plurality of openings formed therein; a vertically extending partition mounted in said casing; a pair of oppositely disposed curved partitions mounted in said casing, projecting outwardly from the lower end of said vertically extending partition, and paralleling the side walls for a portion of their length and terminating in conjunction therewith; a horizontal partition mounted in said casing connecting said curved partitions intermediate their length; and a rear wall mounted in said casing adapted for closing the compartments formed therein from the rear wall, excepting the lowermost compartment, said lowermost compartment being in communication with the opening formed in said rear wall and an opening formed in the front wall.

2. The vehicle signal casing comprising curved side walls, having a rear wall formed integral thereof; a front wall mounted on said side walls adapted for overlapping the same, said front wall being provided with a plurality of openings formed therein; a plurality of partitions mounted in said casing and arranged to form a yoke, the tree of said yoke engaging the inner surface of said side walls at its end and projecting inwardly therefrom, and the arms of said yoke engaging the inner surface of said side wall at their ends; a horizontally disposed partition positioned between and connecting said arms intermediate their ends for providing a plurality of compartments; and a vertically extending wall separating all of said compartments except the compartment determined by the free ends of said arms from the rear wall, said rear wall having an opening formed therein in registration with said compartment.

In testimony whereof I have signed the foregoing specification at Detroit, in the county of Wayne and State of Michigan.

EARL GONDER.